United States Patent
Moore (10) Patent No.: US 6,867,527 B2
(45) Date of Patent: Mar. 15, 2005

(54) METHOD AND APPARATUS FOR REDUCING DYNAMO-ELECTRIC MACHINE VIBRATION

(75) Inventor: Bradley Graham Moore, Greenville, SC (US)

(73) Assignee: General Electric Canada, Inc., Mississauga (CA)

( * ) Notice: Subject to any disclaimer, the term of this patent is extended or adjusted under 35 U.S.C. 154(b) by 98 days.

(21) Appl. No.: 10/065,191

(22) Filed: Sep. 25, 2002

(65) Prior Publication Data

US 2004/0055142 A1 Mar. 25, 2004

(51) Int. Cl.[7] .............................................. H02K 19/14
(52) U.S. Cl. ........................ 310/211; 310/51; 310/215
(58) Field of Search ............................ 310/51, 211–216

(56) References Cited

U.S. PATENT DOCUMENTS

| | | | | |
|---|---|---|---|---|
| 1,950,197 | A | * | 3/1934 | Taylor .......................... 310/211 |
| 2,794,138 | A | * | 5/1957 | Dunn, Jr. ..................... 310/211 |
| 2,944,171 | A | * | 7/1960 | Alger .......................... 310/211 |
| 3,027,474 | A | * | 3/1962 | Rosenberry, Jr.310 ...... 310/211 |
| 3,401,280 | A | * | 9/1968 | Lackey et al. ................. 310/42 |
| 3,688,141 | A | * | 8/1972 | Maslennikov et al. ...... 310/211 |
| 3,778,652 | A | * | 12/1973 | Endress ....................... 310/211 |
| 3,780,325 | A |   | 12/1973 | Frankenhauser ............ 310/214 |
| 3,832,583 | A | * | 8/1974 | Chang ......................... 310/201 |
| 4,327,302 | A |   | 4/1982 | Hershberger ................ 310/156 |
| 4,358,696 | A |   | 11/1982 | Liu et al. ..................... 310/156 |
| 4,369,389 | A |   | 1/1983 | Lambrecht ................... 310/214 |
| 4,432,135 | A |   | 2/1984 | Greenlee ...................... 29/598 |
| 4,584,497 | A |   | 4/1986 | Butman, Jr. et al. ......... 310/214 |
| 4,782,260 | A | * | 11/1988 | Gandhi et al. .............. 310/216 |
| 4,831,301 | A | * | 5/1989 | Neumann .................... 310/216 |
| 5,122,698 | A |   | 6/1992 | Walker et al. .............. 310/214 |
| 5,182,483 | A |   | 1/1993 | Hibino et al. ............... 310/211 |
| 5,430,340 | A |   | 7/1995 | Shih et al. .................. 310/214 |
| 5,793,138 | A | * | 8/1998 | Kliman et al. .............. 310/211 |
| 5,886,443 | A | * | 3/1999 | Dymond et al. ............ 310/196 |
| 6,064,134 | A |   | 5/2000 | El-Antably et al. ......... 310/261 |
| 6,252,329 | B1 |   | 6/2001 | Del Fabbro ................. 310/217 |
| 6,362,552 | B1 | * | 3/2002 | Jeppesen .................... 310/216 |
| 6,417,596 | B1 |   | 7/2002 | Schurter et al. ............ 439/857 |

* cited by examiner

Primary Examiner—Karl Tamai
Assistant Examiner—Yahveh Comas
(74) Attorney, Agent, or Firm—Armstrong Teasdale LLP (57) ABSTRACT

A method of fabricating a dynamo-electric machine rotor is provided. The method includes forming a plurality of laminations, such that a plurality of openings extend through the laminations between an outer peripheral edge and an inner peripheral edge arcuately spaced about the lamination wherein each opening includes an edge with a tongue that extends into the opening, stacking the laminations to form a core wherein adjacent opening are substantially aligned to form a slot in the core and filling the core slots with rotor bar material.

29 Claims, 6 Drawing Sheets

METHOD AND APPARATUS FOR REDUCING DYNAMO-ELECTRIC MACHINE VIBRATION

BACKGROUND OF INVENTION

This invention relates generally to dynamo-electric machines and, more particularly, to structures for reducing vibration within the dynamo-electric machine.

Dynamo-electric machine rotors formed of a stack of laminations having slots equally spaced from one another about the periphery of each lamination are known. Such rotors are often used in inductive AC motors and generators and include conducting members that extend axially along the rotor through aligned slots of the stacked laminations. The conducting members or bars interact with a rotating magnetic field created in an air gap between the outer circumference of the rotor and the inner circumference of the machine stator. Windings embedded in slots between radially inwardly projecting teeth of the stator, adjacent the air gap, are connected to the AC mains, and the stator winding conductors pass through a certain order of the stator slots so as to cause magnetic flux in the air gap to rotate in synchronism with the frequency of the AC mains.

The rotor bars may be cast in situ in the rotor slots, or may be pressed into the rotor slots. Ends of the bars are coupled by electrically conductive end-rings which may be integrally formed with the bars or may be brazed to the ends of the bars.

During operation, maintaining continuous contact between the rotor bars and the rotor core facilitates reducing rotor vibration. More specifically, continuous contact with the rotor bars facilitates controlling high frequency vibration caused by loose bars. Additionally, accommodating thermal expansion of the rotor components reduces rotor imbalance caused by reaction forces generated by the differential expansion of the rotor bars and slots. Such reaction forces are proportional to slot frictional forces, which oppose rotor bar expansion and may cause rotor unbalance problems. In operation, the temperature of the motor will increase with load. In some motors, the magnitude and angle of the vibration changes noticeably with rotor temperature because of non-uniform expansion of the rotor. Such non-uniform expansion may result from some rotor bars locking in their slots when the slot frictional force exceeds the thermal elongation differential between bar and slot.

SUMMARY OF INVENTION

In one aspect, a method of fabricating a dynamo-electric machine rotor is provided. The method includes forming a plurality of laminations, such that a plurality of openings extend through the laminations between an outer peripheral edge and an inner peripheral edge arcuately spaced about the lamination wherein each opening includes an edge with a tongue that extends into the opening, stacking the laminations to form a core wherein adjacent opening are substantially aligned to form a slot in the core and filling the core slots with rotor bar material.

In another aspect, a lamination configuration for use in a rotor core of a dynamo-electric machine is provided. The lamination includes a unitary body fabricated from a ferromagnetic material, an outer peripheral edge of the body, an inner peripheral edge spaced radially from the outer peripheral edge, and a plurality of openings through the body between the outer peripheral edge and the inner peripheral edge and arcuately spaced about the body. The openings each include an edge, the edge includes a tongue which includes a fixed end and a distal end, the tongue extends from the edge into the opening.

In yet another aspect, a rotor configuration for use in a dynamo-electric machine is provided. The rotor includes a stack of laminations having a peripheral portion interposed between a first end face and a second opposing end face, the laminations have a plurality of openings each having an edge, the edge includes a tongue with a fixed end and a distal end, the tongue extending from the edge into the opening. The laminations are stacked to form a core wherein adjacent openings are substantially aligned to form a slot in the core such that the slot extends from the first end face to the second end face, and a plurality of conductive rotor bars comprising a first end and a second end. The bars are mounted in the rotor slots wherein the slot tongue distal ends are resiliently displaced away from the bars biasing the bars in a direction toward the peripheral portion.

DETAILED DESCRIPTION

Figure 1:
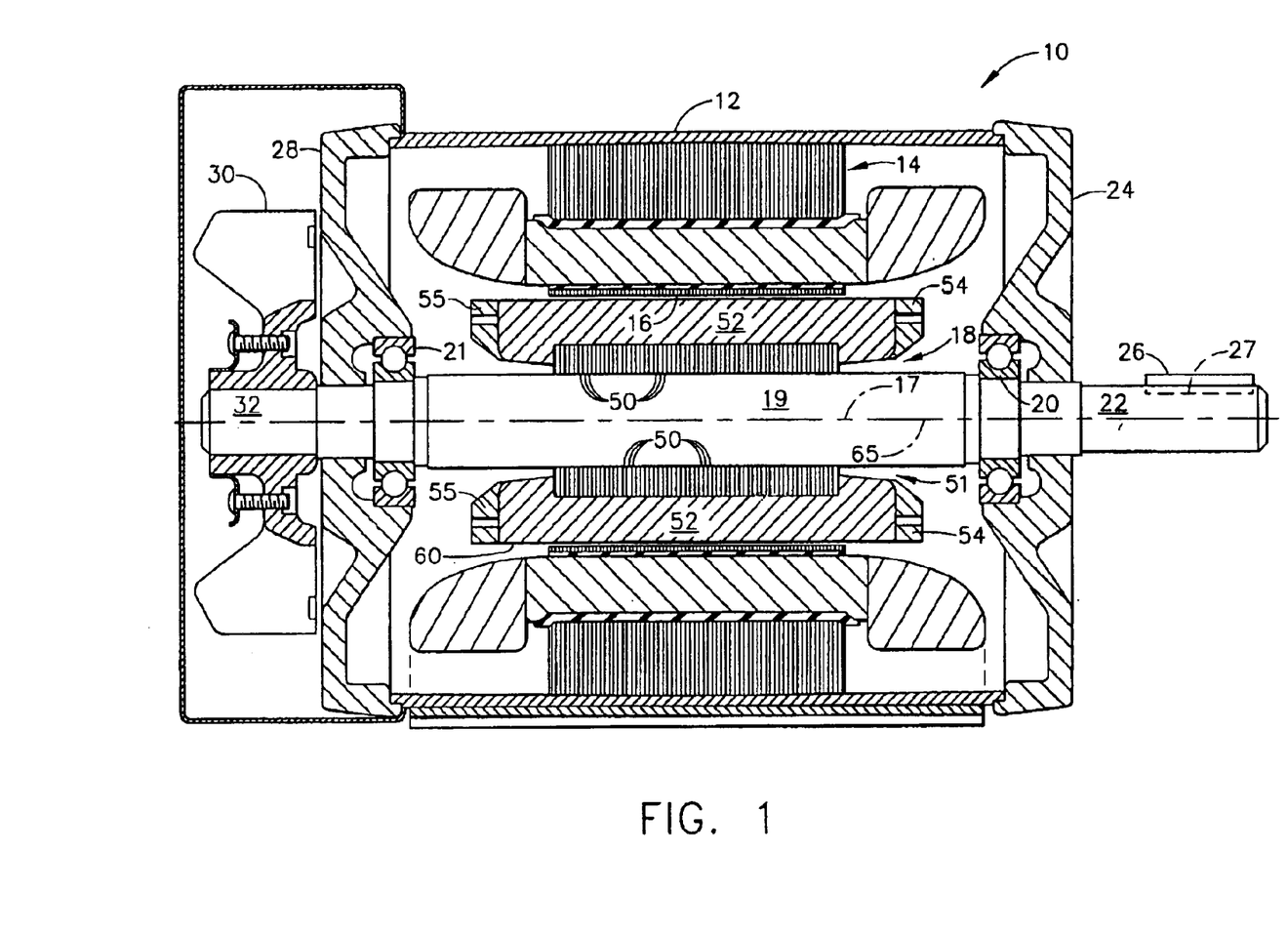
FIG. 1 is a side cross sectional view of an electric motor.

FIG. 1 illustrates a side cross sectional view of an electric motor 10. Motor 10 includes a substantially cylindrical outer casing 12, and a generally cylindrical stator 14 that is positioned substantially coaxially within outer casing 12, and includes a coaxial stator bore 16 that extends therethrough. A rotor 18 includes a shaft 19 and is supported by a front bearing 20 and a back bearing 21 which are each coupled to casing 12. Rotor 18 extends axially through stator bore 16 for rotational movement about a stator bore axis 17. In an exemplary embodiment, a rotor shaft extension 22 extends axially from a front end shield 24 of motor 10, and includes a key 26 that projects radially outward from a keyway 27 that is cut axially a distance from shaft extension 22. Key 26 locks shaft extension 22 into a corresponding key way cut in a load member (not shown) e.g. a fan, to which rotational motive power is to be supplied by motor 10.

A back end shield 28 together with casing 12 and front end shield 24 contains protects stator 14, rotor 18 and associated conductive windings. In the example shown, a motor cooling fan 30 is mounted on a rotor stub portion 32 that extends outwardly from back end shield 28, and directs an air current flow over casing 12.

Shaft 19 extends axially through stator bore 16 and includes a stack of rotor laminations 50 fixed coaxially on shaft 19 intermediate front bearing and back bearings, 20 and 21, respectively. The stack of rotor laminations 50 form a rotor core 51. Sets of conductive bars 52 pass through axially extending slots formed in rotor core 51 near an outer periphery of each lamination 50. Bars 52 are shorted to one another at an axial end of the stack of laminations 50 by a pair of end rings 54, 55.

Figure 2:
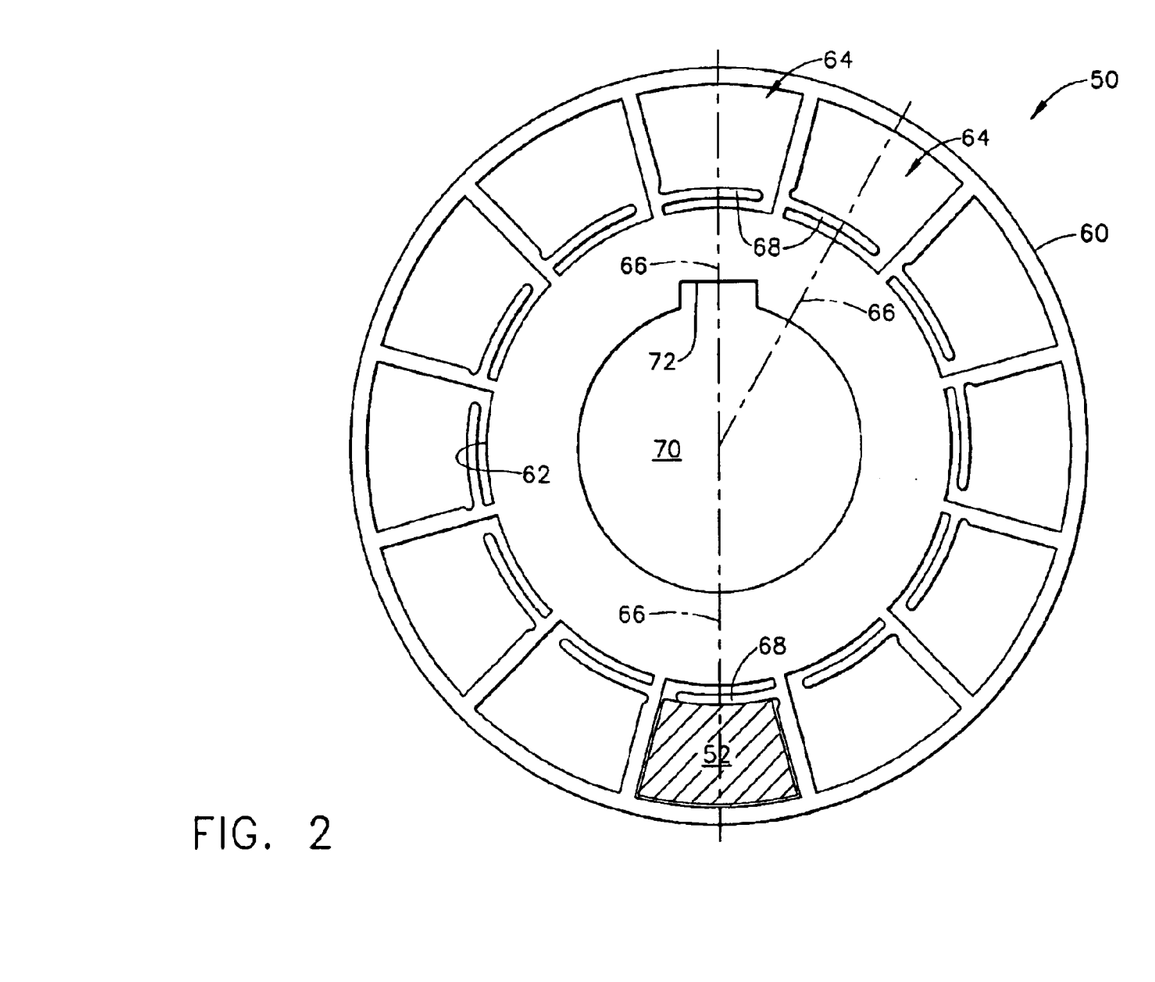
FIG. 2 is a plan view of an exemplary embodiment of a rotor lamination.

FIG. 2 is a plan view of an exemplary embodiment of rotor lamination 50. Lamination 50 is formed of a substantially flat plate of ferromagnetic material that includes an outer, substantially circular peripheral edge 60 and an inner peripheral edge 62 that is radially inward from outer peripheral edge 60. Lamination 50 includes a plurality of uniformly circumferentially spaced openings 64 that extend symmetrically about radial center lines 66 in a region near the outer peripheral edge 60. Openings 64 are formed to contain conductive bars 52 (shown in FIG. 1) which extend substantially parallel to a rotor axis 65 when laminations 50 are stacked such that openings 64 are substantially aligned with respect to each other (i.e., in communication with one another). In the exemplary embodiment, each opening 64 is substantially trapezoidally-shaped. In an alternative embodiment, openings 64 may be shaped to accommodate two rotor bars per slot for better acceleration characteristics. In another alternative embodiment, openings 64 may be shaped with leading or trailing portions for altering a magnetic interaction between the core magnetic field and the stator magnetic field.

In a further alternative embodiment, openings 64 may be non-trapezoidally shaped. Near inner peripheral edge 62, an integrally formed tongue 68 extends into each opening 64. In one embodiment, a central aperture 70 extends through lamination 50 and is sized to receive rotor shaft 22. In another embodiment, a keyway 72 extends through lamination 50 and forms a portion of aperture 70. When laminations 50 are stacked together in face-to-face communication to form rotor core 51, each keyway 72 is substantially aligned with each keyway 72.

Figure 3:
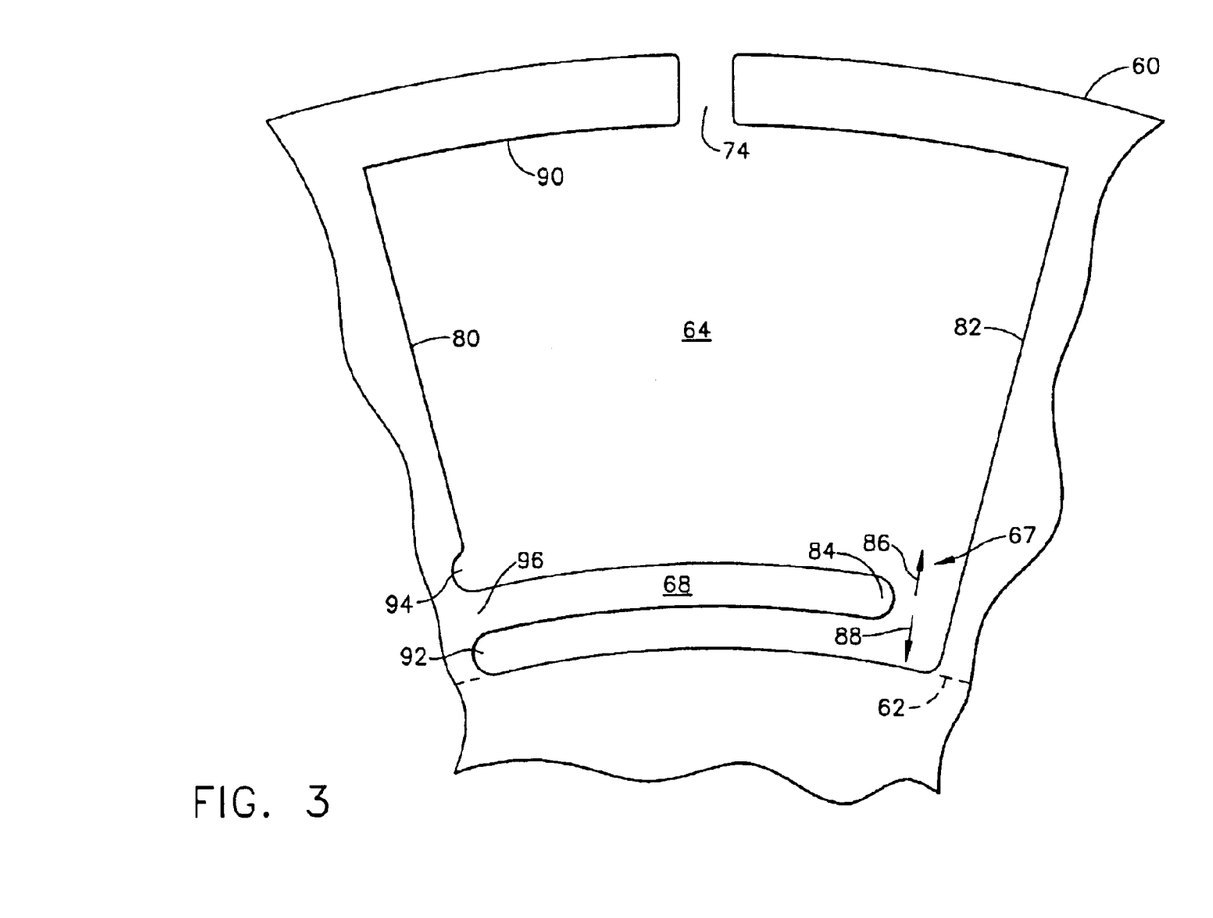
FIG. 3 is an enlarged plan view of an exemplary lamination opening that may be used with the rotor lamination shown in FIG. 2.

FIG. 3 is an enlarged plan view of a lamination opening 64 including a spring assembly 67. Opening 64 is substantially trapezoidally-shaped and is sized to receive at least one of rotor bars 52 therein. In an exemplary embodiment, opening 64 includes a passage 74 that extends through outer peripheral edge 60. In an alternative embodiment, passage 74 is closed. Each opening 64 includes a first edge 80 and a second edge 82 that converge toward each other, such that each opening 64 is generally convergent from outer peripheral edge 60 toward inner peripheral edge 62. Spring assembly 67 is positioned between edge 80 and edge 82 adjacent inner peripheral edge 62. Tongue 68 extends from first edge 80 into opening 64 proximate to inner peripheral edge 62. Tongue distal end 84 is resiliently flexible in a direction 86 towards outer peripheral edge 60, and also in a direction 88 towards inner peripheral edge 62. In the exemplary embodiment, a notch 92 and an opposing notch 94 are located in edge 80 proximate a fixed end 96 of tongue 68. Notches 92 and 94 are substantially semi-circularly-shaped and cooperate to relieve stresses induced in edge 80 when tongue 68 flexes in direction 86 or 88. In other alternative embodiments, notches are substantially non-semi-circularly shaped.

In operation, a portion of rotor bar 52 (shown in FIG. 1) substantially fills opening 64 and is in contact with edge 90, edges 80 and 82, and tongue 68 such that lamination 50 is frictionally engaged to rotor bar 52. Tongue distal end 84 is flexed toward direction 88 which causes tongue distal end 84 to apply a bias in direction 86 to rotor bar 52. As lamination 50 and rotor bar 52 increase in temperature during operation of motor 10, rotor 18 may experience imbalance caused by reaction forces generated by a differential expansion of lamination 50 and rotor bars 52. Such reaction forces are proportional to frictional forces between lamination 50 and rotor bars 52, which oppose rotor bar 52 expansion and can cause rotor 18 unbalance problems when the reaction forces exceed a limit. In operation, a temperature of motor 10 will increase with load. In some motors, a magnitude and an angle of a vibration changes substantially with rotor temperature. Such change occurs because of non-uniform expansion of rotor 18. Such non-uniform expansion may result from some rotor bars 52 locking in their openings 64 when the frictional forces between lamination 50 and rotor bars 52 exceeds a thermal elongation differential force between lamination 50 and rotor bars 52. Tongue 68, acting as a spring to bias rotor bar 52 in direction 86 facilitates reducing frictional forces between lamination 50 and rotor bars 52 allowing rotor 18 to expand uniformly thus, reducing rotor vibration.

A magnetomotive force induced to rotor bars 52 is cyclic, as rotor 18 rotates in motor 10 due to an interaction between cyclically varying magnetic fields in stator 14 and rotor 18. Such force imparts cyclic stresses to lamination 50 by rotor bars 52 tending to loosen rotor bars 52 in openings 64 over time. Loose bars cause vibration in rotor 18. A constant bias force provided by tongue 68 will maintain intimate contact between lamination 50 and rotor bar 52 to reduce vibration in rotor 18.

Figure 4:
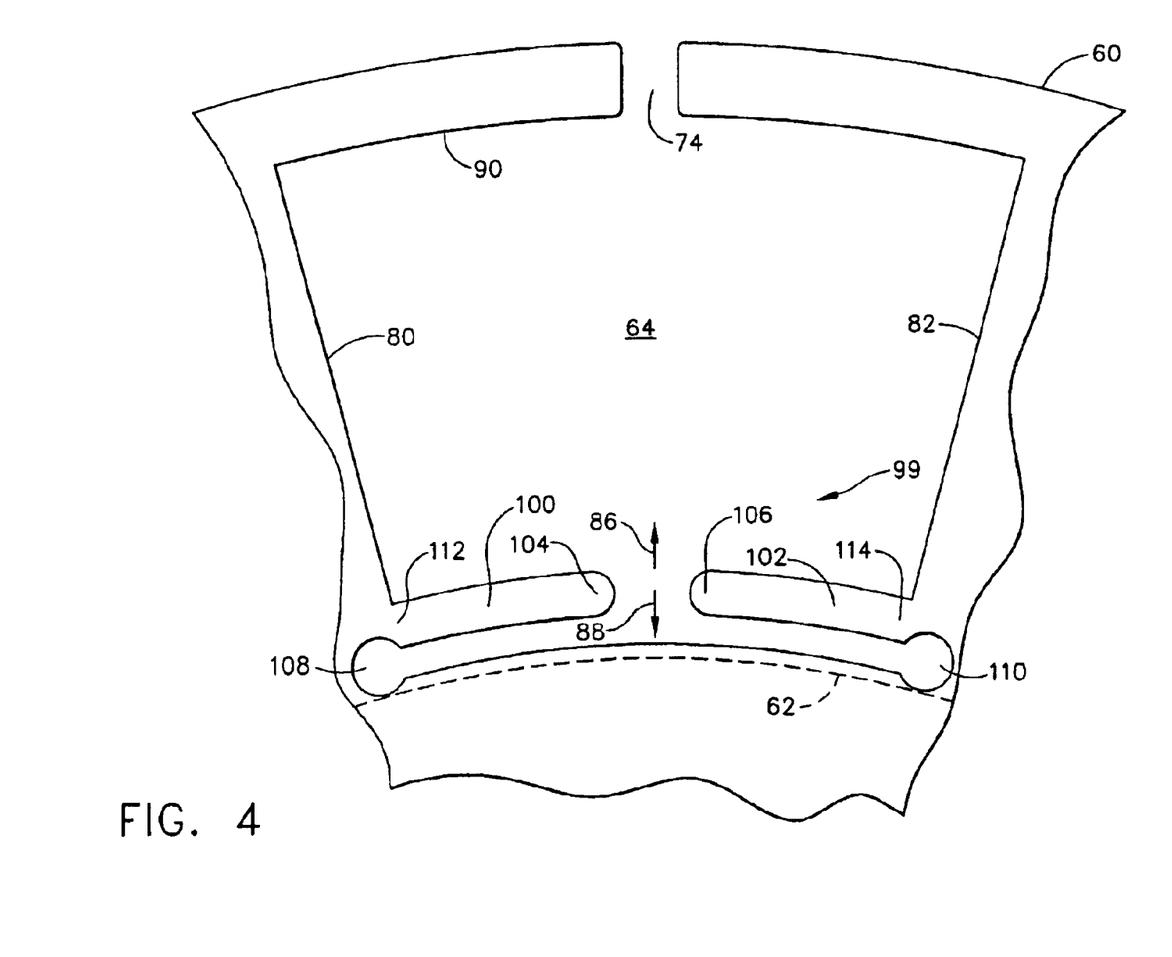
FIG. 4 is an enlarged plan view of an alternative embodiment of a lamination opening that may be used with the rotor lamination shown in FIG. 2.

FIG. 4 is an enlarged plan view of an alternative embodiment of lamination opening 64 including an integral spring assembly 99. Lamination opening 64 is substantially similar to lamination openings 64 shown in FIG. 3. Components in lamination opening 64 in FIG. 4 that are identical to components of lamination opening 64 shown in FIG. 3 are identified in FIG. 4 using the same reference numerals used in FIG. 3. Opening 64 is substantially trapezoidally-shaped and is sized to receive at least one of rotor bars 52 therein. In an exemplary embodiment, opening 64 includes a passage 74 that extends through outer peripheral edge 60. In an alternative embodiment, passage 74 is closed. Each opening 64 includes a first edge 80 and a second edge 82 that converge toward each other, such that each opening is generally convergent from outer peripheral edge 60 toward inner peripheral edge 62. Integral spring assembly 99 is positioned between edges 80 and 82 adjacent inner peripheral edge 62. A first tongue 100 extends from first edge 80 into opening 64 and is adjacent to inner peripheral edge 62. A second tongue 102 extends from second edge 82 into opening 64 and is also adjacent to inner peripheral edge 62. Tongues 100 and 102 each include a distal end 104 and 106, respectively, which are proximate each other and intermediate edges 80 and 82. Each tongue distal ends 104 and 106 are resiliently flexible in a direction 86 towards outer peripheral edge 60 and also in a direction 88 towards inner peripheral edge 62. In the alternative exemplary embodiment, a circular shaped notch 108 is located in edge 80 proximate a fixed end 112 of tongue 100. A circular shaped notch 110 is located in edge 82 proximate a fixed end 114 of tongue 102. Notches 108 and 110 relieve stresses induced in edges 80 and 82 respectively, when tongues 100 and 102 flex in direction 86 or 88. In alternative embodiments, notches are substantially non-circularly shaped.

In operation, a portion of rotor bar 52 (shown in FIG. 1) substantially fills opening 64 and is in contact with edge 90, edges 80 and 82, and tongues 100 and 102 such that lamination 50 is frictionally engaged to rotor bar 52. Tongue distal ends 104 and 106 are flexed toward direction 88 which causes tongue distal ends 104 and 106 to apply a bias in direction 86 to rotor bar 52. As lamination 50 and rotor bar 52 increase in temperature during operation of motor 10, rotor 18 may experience imbalance caused by reaction forces generated by a differential expansion of lamination 50 and rotor bars 52. Such reaction forces are proportional to frictional forces between lamination 50 and rotor bars 52, which oppose rotor bar 52 expansion and can cause rotor 18 unbalance problems when the reaction forces exceed a limit. In operation, a temperature of motor 10 will increase with load. In some motors, a magnitude and an angle of a vibration changes substantially with rotor temperature. Such change occurs because of non-uniform expansion of rotor 18. Such non-uniform expansion may result from some rotor bars 52 locking in their openings 64 when the frictional forces between lamination 50 and rotor bars 52 exceeds a thermal elongation differential force between lamination 50 and rotor bars 52. Tongues 100 and 102, acting as springs to bias rotor bar 52 in direction 86 facilitates reducing frictional forces between lamination 50 and rotor bars 52 allowing rotor 18 to expand uniformly thus, reducing rotor vibration.

A magnetomotive force induced to rotor bars 52 is cyclic, as rotor 18 rotates in motor 10 due to an interaction between cyclically varying magnetic fields in stator 14 and rotor 18. Such force imparts cyclic stresses to lamination 50 by rotor bars 52 tending to loosen rotor bars 52 in openings 64 over time. Loose bars cause vibration in rotor 18. A constant bias force provided by tongues 100 and 102 will maintain intimate contact between lamination 50 and rotor bar 52 to reduce vibration in rotor 18.

Figure 5:
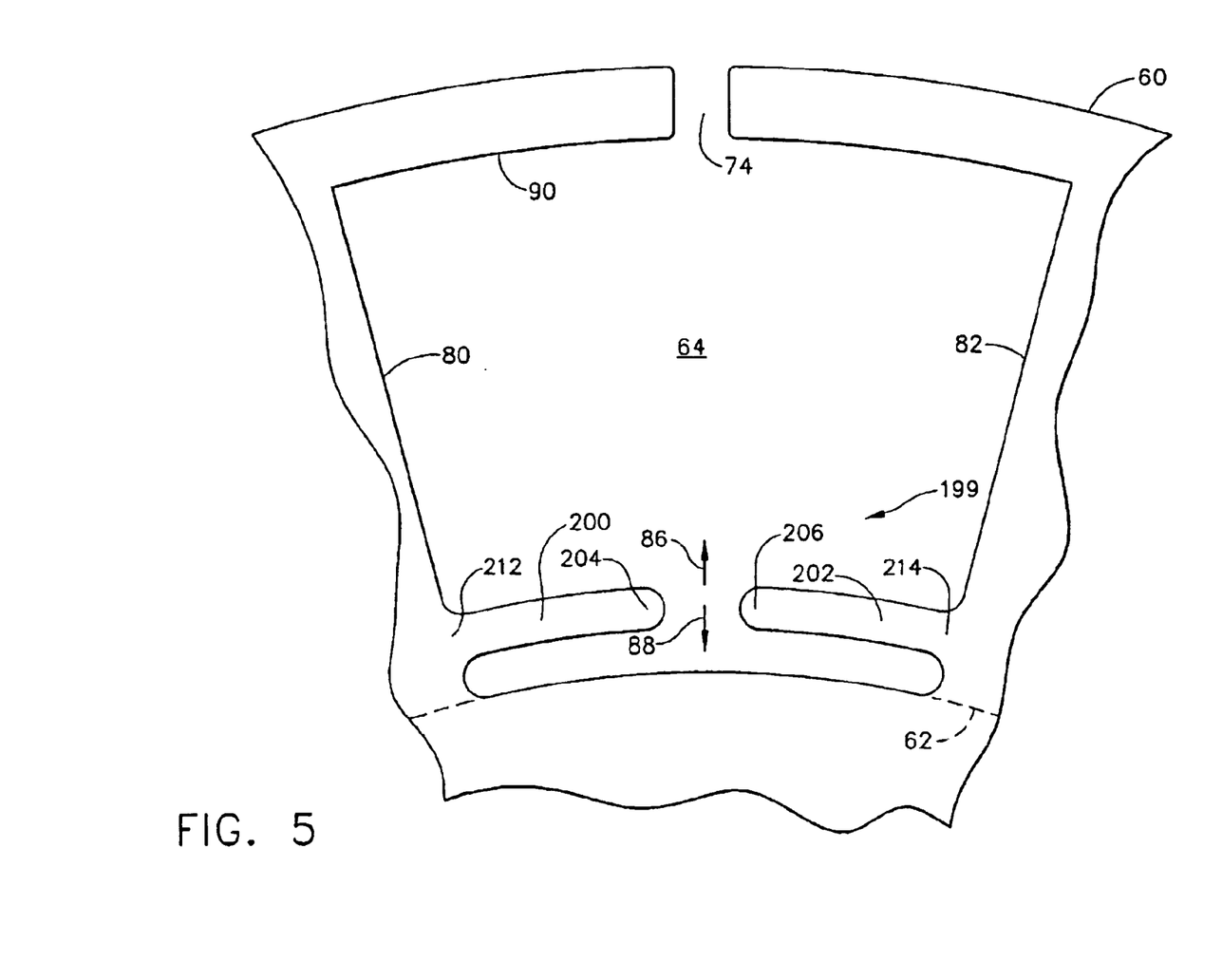
FIG. 5 is an enlarged plan view of another alternative embodiment of lamination opening that may be used with the rotor lamination shown in FIG. 2.

FIG. 5 is an enlarged plan view of another alternative embodiment of lamination opening 64 including an integral spring assembly 199. Lamination opening 64 is substantially similar to lamination opening 64 shown in FIG. 3. Components in lamination opening 64 in FIG. 5 that are identical to components of lamination opening 64 shown in FIG. 3 are identified in FIG. 5 using the same reference numerals used in FIG. 3. Opening 64 is substantially trapezoidally-shaped and is sized to receive one of rotor bars 52 therein. In this embodiment, opening 64 includes a passage 74 that extends through outer peripheral edge 60. In an alternative embodiment, passage 74 is closed. Each opening 64 includes a first edge 80 and a second edge 82 that converge toward each other, such that each opening is generally convergent from outer peripheral edge 60 toward inner peripheral edge 62. Integral spring assembly 199 is positioned between edges 80 and 82 adjacent inner peripheral edge 62. A first tongue 200 extends from first edge 80 into opening 64 and is adjacent to inner peripheral edge 62. A second tongue 202 extends from second edge 82 into opening 64 and is also adjacent to inner peripheral edge 62. Tongues 200 and 202 each includes a distal end 204 and 206, respectively, which are proximate each other and intermediate edges 80 and 82. Each tongue distal ends 204 and 206 are resiliently flexible in a direction 86 towards outer peripheral edge 60 and also in a direction 88 towards inner peripheral edge 62. Tongues 200 and 202 each includes a fixed end 212 and 214, respectively.

In operation, a portion of rotor bar 52 (shown in FIG. 1) substantially fills opening 64 and is in contact with edge 90, edges 80 and 82 and tongues 200 and 202 such that lamination 50 is frictionally engaged to rotor bar 52. Tongue distal ends 204 and 206 are flexed toward direction 88 which causes tongue distal ends 204 and 206 to apply a bias in direction 86 to rotor bar 52. As lamination 50 and rotor bar 52 increase in temperature during operation of motor 10, rotor 18 may experience imbalance caused by reaction forces generated by a differential expansion of lamination 50 and rotor bars 52. Such reaction forces are proportional to frictional forces between lamination 50 and rotor bars 52, which oppose rotor bar 52 expansion and can cause rotor 18 unbalance problems when the reaction forces exceed a limit. In operation, a temperature of motor 10 will increase with load. In some motors, a magnitude and an angle of a vibration changes substantially with rotor temperature. Such change occurs because of non-uniform expansion of rotor 18. Such non-uniform expansion may result from some rotor bars 52 locking in their openings 64 when the frictional forces between lamination 50 and rotor bars 52 exceeds a thermal elongation differential force between lamination 50 and rotor bars 52. Tongues 200 and 202, acting as springs to bias rotor bar 52 in direction 86 facilitates reducing frictional forces between lamination 50 and rotor bars 52 allowing rotor 18 to expand uniformly thus, reducing rotor vibration.

A magnetomotive force induced to rotor bars 52 is cyclic, as rotor 18 rotates in motor 10 due to an interaction between cyclically varying magnetic fields in stator 14 and rotor 18. Such force imparts cyclic stresses to lamination 50 by rotor bars 52 tending to loosen rotor bars 52 in openings 64 over time. Loose bars cause vibration in rotor 118. A constant bias force provided by tongues 200 and 202 will maintain intimate contact between lamination 50 and rotor bar 52 to reduce vibration in rotor 18.

Figure 6:
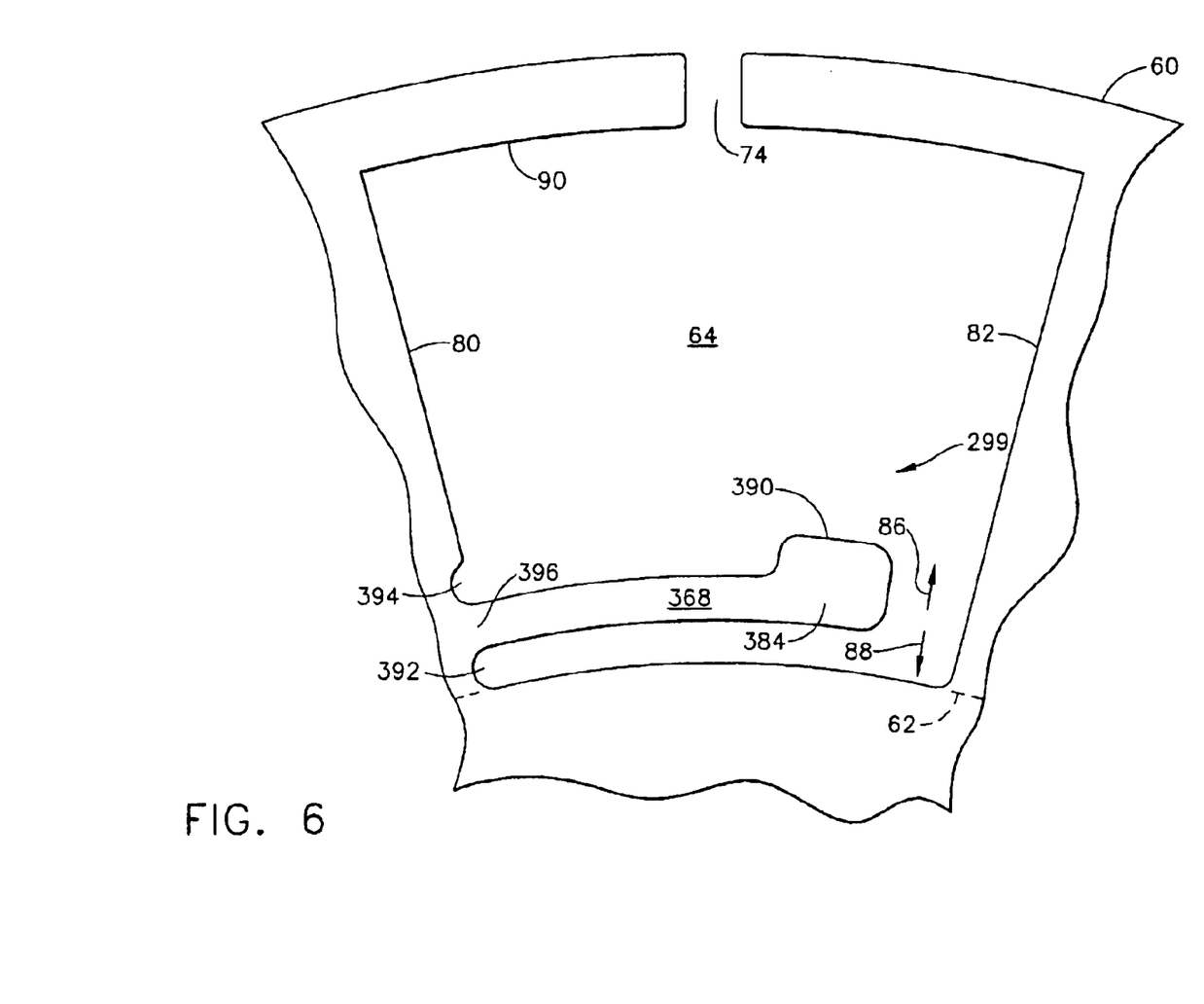
FIG. 6 is an enlarged plan view of yet another alternative embodiment of lamination opening that may be used with the rotor lamination shown in FIG. 2.

FIG. 6 is an enlarged plan view of yet another alternative embodiment of lamination opening 64 including an integral spring assembly 299. Lamination opening 64 is substantially similar to lamination opening 64 shown in FIG. 3. Components in lamination opening 64 in FIG. 6 that are identical to components of lamination opening 64 shown in FIG. 3 are identified in FIG. 6 using the same reference numerals used in FIG. 3. Opening 64 is substantially trapezoidally-shaped and is sized to receive at least one of rotor bars 52 therein. In an exemplary embodiment, opening 64 includes a passage 74 that extends through outer peripheral edge 60. In an alternative embodiment, passage 74 is closed. Each opening 64 includes a first edge 80 and a second edge 82 that converge toward each other, such that each opening is generally convergent from outer peripheral edge 60 toward inner peripheral edge 62. Integral spring assembly 299 is positioned between edges 80 and 82 adjacent inner peripheral edge 62. Tongue 368 extends from first edge 80 into opening 64 and is adjacent to inner peripheral edge 62. Tongue distal end 384 is resiliently flexible in a direction 86 towards outer peripheral edge 60, and in a direction 88 towards inner peripheral edge 62. In the exemplary embodiment, a notch 392 and an opposing notch 394 are located in edge 80 proximate a fixed end 396 of tongue 368. Notches 392 and 394 are substantially semi-circularly-shaped and cooperate to relieve stresses induced in edge 80 when tongue 368 flexes in direction 86 or 88. In other embodiments, notches are substantially non semi-circularly shaped. Tongue distal end 384 includes a raised portion 390 that extends perpendicularly from distal end 384 toward outer peripheral edge 60.

In operation, a portion of rotor bar 52 (shown in FIG. 1) substantially fills opening 64 and is in contact with edge 90, edges 80 and 82 and tongue 368 such that lamination 50 is frictionally engaged to rotor bar 52. Tongue distal end 384 is flexed toward direction 88 which causes tongue distal end 384 to apply a bias in direction 86 to rotor bar 52. Raised portion 390 allows rotor bar 52 to contact tongue 368 through portion 390. Because force communication between tongue 368 and rotor bar 52 can only occur at tongue distal end 384, tongue 368 is more flexible than the embodiment of FIG. 3. As lamination 50 and rotor bar 52 increase in temperature during operation of motor 10, rotor 18 may experience imbalance caused by reaction forces generated by a differential expansion of lamination 50 and rotor bars 52. Such reaction forces are proportional to frictional forces between lamination 50 and rotor bars 52, which oppose rotor bar 52 expansion and can cause rotor 18 unbalance problems when the reaction forces exceed a limit. In operation, a temperature of motor 10 will increase with load. In some motors, a magnitude and an angle of a vibration changes substantially with rotor temperature. Such change occurs because of non-uniform expansion of rotor 18. Such non-uniform expansion can result from some rotor bars 52 locking in their openings 64 when the frictional forces between lamination 50 and rotor bars 52 exceeds a thermal elongation differential force between lamination 50 and rotor bars 52. Tongue 368, acting as a spring to bias rotor bar 52 in direction 86 facilitates reducing the frictional forces between lamination 50 and rotor bars 52 allowing rotor 18 to expand uniformly thus, reducing rotor vibration.

A magnetomotive force induced to rotor bars 52 is cyclic, as rotor 18 rotates in motor 10 due to an interaction between cyclically varying magnetic fields in stator 14 and rotor 18. Such force imparts cyclic stresses to lamination 50 by rotor bars 52 tending to loosen rotor bars 52 in openings 64 over time. Loose bars cause vibration in rotor 18. A constant bias force provided by tongue 368 will maintain intimate contact between lamination 50 and rotor bar 52 to reduce vibration in rotor 18.

It is well known that in order to decouple stator slot order harmonics, the rotor bars 52 in the squirrel cage rotor 18 of an induction motor 10 should be skewed. Skewing is accomplished by turning the rotor laminations 50 making up the rotor slightly with respect to each other so that the passages formed by overlapping openings 64 of the rotor laminations 50 are generally helical in shape. As a result, the phases of the electromotive force induced in the rotor bars 52 by the harmonics are deviated slightly from portion to portion of one rotor bar 52. Consequently, the harmonics due to the whole electromotive force are canceled, and occurrence of the abnormal torque is restrained.

Other dynamo-electric machines of similar construction to squirrel cage rotors described above will benefit from laminations including integral springs of the type described herein. Such machines include, for example, induction generators.

While the invention has been described in terms of various specific embodiments, those skilled in the art will recognize that the invention can be practiced with modification within the spirit and scope of the claims.

What is claimed is:

1. A lamination configuration for use in a rotor core of a dynamo-electric machine, the lamination configuration comprising:
    a unitary body fabricated from a ferromagnetic material, said body comprising:
    an outer peripheral edge;
    an inner peripheral edge spaced radially from said outer peripheral edge; and
    a plurality of openings that extend through said body between said outer peripheral edge and said inner peripheral edge of the body such that said openings are arcuately spaced about said body, said openings each comprising a first edge and a second edge, said first edge comprising a tongue, said tongue comprising a fixed end and a distal end, said tongue extending from said first edge into said opening, said first edge further comprises a semi-circular notch adjacent said tongue fixed end and said inner peripheral edge.

2. A lamination in accordance with claim 1 wherein said openings are each substantially trapezoidal-shaped.

3. A lamination in accordance with claim 1 wherein said tongue extends perpendicularly to a radial axis of said opening.

4. A lamination in accordance with claim 1 wherein said openings are each configured to receive a conductive rotor bar.

5. A lamination in accordance with claim 1 wherein said tongue is resiliently flexible in a first direction toward said outer peripheral edge and in a second direction toward said inner peripheral edge.

6. A lamination in accordance with claim 1 wherein said tongue is disposed proximate to said inner peripheral edge.

7. A lamination in accordance with claim 1 wherein said first edge comprises a tongue comprising a fixed end and a distal end, said first edge tongue extends from said first edge into said opening, said tongue disposed proximate to said inner peripheral edge and said second edge comprises a tongue comprising a fixed end and a distal end, said second edge tongue extends from said second edge into said opening, said tongue disposed proximate to said inner peripheral edge.

8. A lamination in accordance with claim 7 wherein said first edge tongue extends into said opening a first distance, said second edge tongue extends into said opening a second distance, said first distance being substantially equal to said second distance.

9. A lamination in accordance with claim 8 wherein said first edge tongue distal end is proximate said second edge tongue distal end.

10. A lamination in accordance with claim 1 wherein said tongue distal end comprises a raised pad that extends toward said outer peripheral edge.

11. A lamination in accordance with claim 1 wherein said first edge further comprises a semi-circular second notch that is adjacent said tongue fixed end opposite said notch.

12. A lamination in accordance with claim 1 wherein further comprising a central aperture that extends therethrough for receiving a rotor shaft.

13. A lamination in accordance with claim 12 wherein said central aperture comprises a key way.

14. A lamination in accordance with claim 1 wherein said openings each also having a third edge parallel and proximate to said outer peripheral edge, said third edge comprising an opening to said outer peripheral edge.

15. A rotor configuration for use in a dynamo-electric machine, said rotor comprising:
    a rotor core comprising a stack of laminations comprising a peripheral portion interposed between a first end face and a second opposing end face, said laminations comprising a plurality of openings each comprising an edge, said edge comprising a tongue comprising a fixed end and a distal end, said tongue extending from said edge into said opening, said laminations stacked to form a core, said openings substantially aligned to form a slot in said core, said slot extending from said first end face to said second end face; and
    a plurality of conductive rotor bars comprising a first end and a second end, said bars mounted in said rotor slots wherein said slot tongue distal ends are resiliently displaced away from said bars biasing said bars in a direction toward said peripheral portion.

16. A rotor in accordance with claim 15 wherein said laminations are stacked such that said core slots are skewed.

17. A rotor in accordance with claim 15 wherein said openings are substantially trapezoidal-shaped.

18. A rotor in accordance with claim 15 wherein said tongue extends perpendicularly to a radial axis of said opening.

19. A rotor in accordance with claim 15 wherein said openings are each sized to receive a conductive rotor bar.

20. A rotor in accordance with claim 15 wherein said tongue is resiliently flexible in a first direction toward said outer peripheral edge and in a second direction toward said inner peripheral edge.

21. A rotor in accordance with claim 15 wherein said tongue disposed proximate to said inner peripheral edge.

22. A rotor in accordance with claim 15 wherein said first edge comprises a tongue comprising a fixed end and a distal end, said first edge tongue extends from said first edge into said opening, said tongue disposed proximate to said inner peripheral edge and said second edge comprises a tongue comprising a fixed end and a distal end, said second edge tongue extends from said second edge into said opening, said tongue disposed proximate to said inner peripheral edge.

23. A rotor in accordance with claim 22 wherein said first edge tongue extends into said opening a first distance, said second edge tongue extends into said opening a second distance, said first distance being substantially equal to said second distance.

24. A rotor in accordance with claim 23 wherein said first edge tongue distal end is proximate said second edge tongue distal end.

25. A rotor in accordance with claim 15 wherein said tongue distal end comprises a raised pad extending toward said outer peripheral edge.

26. A rotor in accordance with claim 15 wherein said edge further comprises a semi-circular first notch adjacent said tongue fixed end and a semi-circular second notch adjacent said tongue fixed end opposite said first notch.

27. A rotor in accordance with claim 15 wherein further comprising a central aperture therethrough for receiving a rotor shaft.

28. A rotor in accordance with claim 27 wherein said central aperture comprises a key way.

29. A rotor in accordance with claim 15 wherein said openings each also having a third edge parallel and proximate to said outer peripheral edge, said third edge comprising an opening to said outer peripheral edge.

* * * * *